(12) United States Patent
Jouret et al.

(10) Patent No.: US 7,769,641 B2
(45) Date of Patent: Aug. 3, 2010

(54) SHARING MEDIA CONTENT ASSETS BETWEEN USERS OF A WEB-BASED SERVICE

(75) Inventors: Guido Jouret, Mountain View, CA (US); Matthew Kuhlke, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 12/273,321

(22) Filed: Nov. 18, 2008

(65) Prior Publication Data

US 2010/0125511 A1 May 20, 2010

(51) Int. Cl.
  *G06Q 30/00* (2006.01)
(52) U.S. Cl. .......................... 705/26; 705/59
(58) Field of Classification Search ............. 705/26, 705/59
  See application file for complete search history.

(56) References Cited

U.S. PATENT DOCUMENTS

| | | | |
|---|---|---|---|
| 7,594,275 B2 * | 9/2009 | Zhu et al. | 726/26 |
| 2004/0024886 A1 | 2/2004 | Saxena | |
| 2004/0267388 A1 | 12/2004 | Perdon | |
| 2005/0187879 A1 * | 8/2005 | Zigmond et al. | 705/59 |
| 2007/0005503 A1 * | 1/2007 | Engstrom et al. | 705/59 |
| 2007/0204011 A1 * | 8/2007 | Shaver et al. | 709/219 |
| 2007/0250911 A1 * | 10/2007 | Nimon et al. | 726/4 |
| 2008/0165956 A1 * | 7/2008 | Zhu et al. | 380/44 |
| 2009/0012805 A1 * | 1/2009 | Schnell et al. | 705/1 |
| 2010/0008500 A1 * | 1/2010 | Lisanke et al. | 380/201 |

OTHER PUBLICATIONS

Celik, "Attention.xml Technology Overview", [online], [retrieved on Aug. 1, 2008]. Retrieved from the Internet: <URL: http://tantek.com/presentations/2005/01/attentionxml.html>, pp. 1-6.
"Serv-U and Information", [online], [retrieved on Aug. 1, 2008]. Retrieved from the Internet: <URL: http://www.serv-u.com/features/>, 1 page.
"Serv-U FTP Server", [online], [retrieved on Aug. 1, 2008]. Retrieved from the Internet: <URL: http://www.serv-u.com>, 1 page.

(Continued)

*Primary Examiner*—Pierre E Elisca
(74) *Attorney, Agent, or Firm*—Leon R. Turkevich

(57) ABSTRACT

In one embodiment, a method comprises receiving a request for access to a media content asset from a first user of a web-based service, the request specifying a second user that has provided access to the media content asset; retrieving, from a user database, a user entry describing attributes associated with the second user; determining whether the user entry includes digital rights metadata for determining whether the second user is licensed to share at least a portion of the media content asset; and selectively providing the first user with access to at least the portion of the media content asset based on determining from the digital rights metadata that the media content asset is licensed to the second user, and determining that the first user is authorized by the second user to access the media content asset.

24 Claims, 6 Drawing Sheets

OTHER PUBLICATIONS

Coyle, "The 'Rights' in Digital Rights Management" D-Lib Magazine, vol. 10, No. 9, Sep. 2004 [online], [retrieved on Aug. 4, 2008]. Retrieved from the Internet: <URL: http://www.dlib.org/dlib/september04/coyle/09coyle.htm>, pp. 1-8.

Toebes, "Enabling A Richer Video Experience With Metadata", [online], W3C Video on the Web Workshop, Dec. 12-13, 2007, [retrieved on Apr. 9, 2008]. Retrieved from the Internet: <URL: http://www.w3.org/2007/08/video/positions/Cisco_MSG.html>, pp. 1-4.

* cited by examiner

SHARING MEDIA CONTENT ASSETS BETWEEN USERS OF A WEB-BASED SERVICE

TECHNICAL FIELD

The present disclosure generally relates to distribution of media content assets (e.g., addressable video streams, addressable audio streams, pictures, photographs, etc.) via a network such as the Internet.

BACKGROUND

Users of networks such as wired or wireless telecommunications networks (e.g., cell phone carriers) or data networks such as the Internet often use such networks to share media content assets among each other. A user can a share media content asset with another individual either by storing a copy of the media content asset on a computer-readable tangible storage medium (e.g., a compact disc, a memory card, etc.) and sharing the tangible storage medium with the other individual, by forwarding a copy of the media content asset via the network to the other user using a computer-executable network service client (e.g., file transfer protocol (FTP), instant messaging client, an e-mail client, peer to peer file sharing), or forwarding a reference (e.g., a uniform resource identifier) to a destination reachable via the data network that provides the media content asset (e.g., a uniform resource locator (URL) link to a YouTube video). A user also can establish an FTP server on his or her computer at the user premises, using for example the commercially-available "Serv-U" FTP server available on the World Wide Web at the website address "www.serv-u.com". Such sharing of media content assets by users, however, can create copyright concerns by the authors and owners of the media content assets.

Users of networks also can purchase media content assets such as videos from online retailers, for example Amazon (available at the website address "www.amazon.com") or Total Video (available at the website address "www.totalvid.com"), or rent videos from online retailers such as Netflix (available at the website address "www.netflix.com"), where a user having purchased the media content asset from the online retailer, or obtained a subscriber rental agreement from the online retailer, can download via the Internet a copy of the media content asset, for example using a streaming media protocol.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
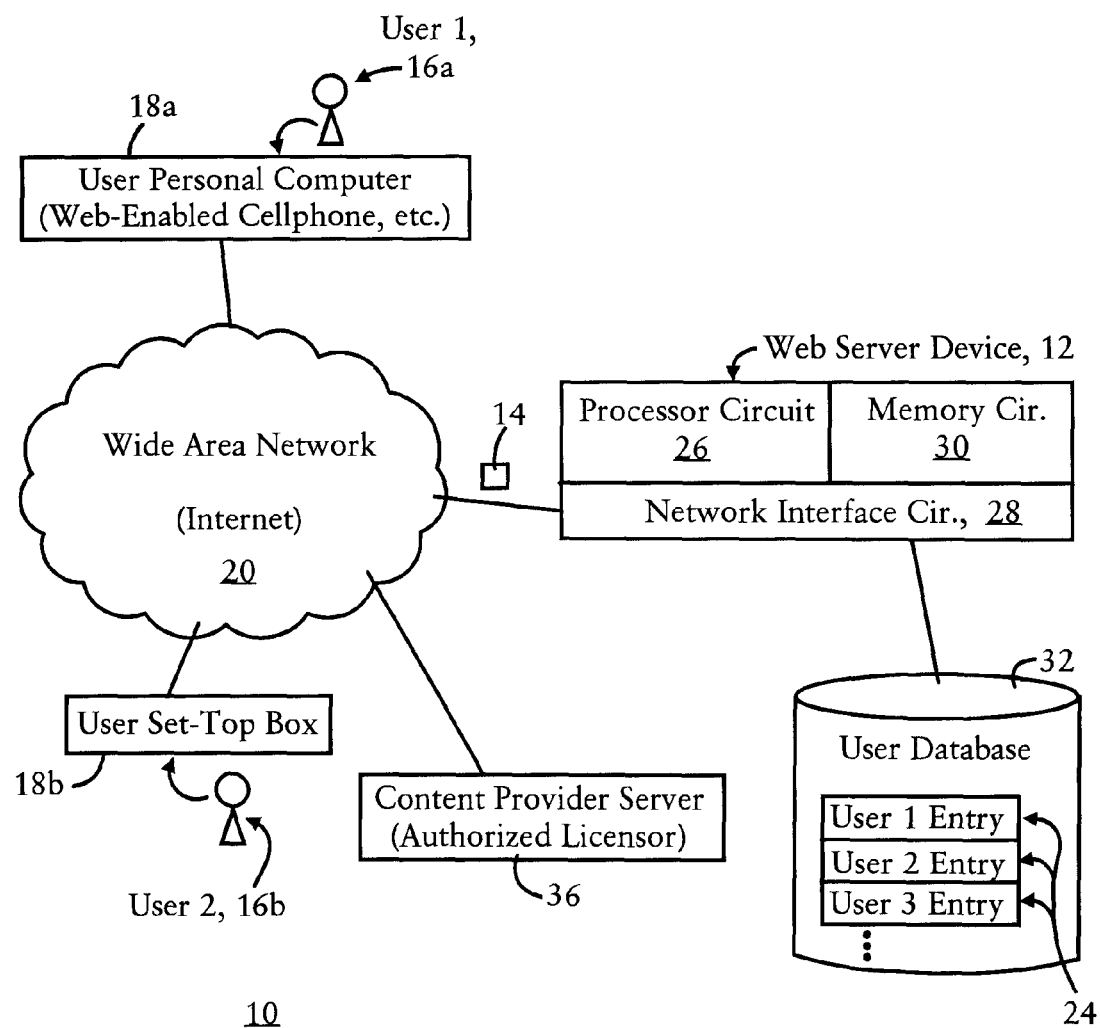
FIG. 1 illustrates an example system having an apparatus (e.g., a web server device) configured for selectively providing a first user with access to a media content asset that is licensed to a second user, according to an example embodiment.

In one embodiment, a method comprises receiving a request for access to a media content asset from a first user of a web-based service, the request received via a wide area network by an apparatus providing the web-based service, the request specifying a second user identified as a user of the web-based service and that has provided access to the media content asset; retrieving, by the apparatus from a user database, a user entry describing attributes associated with the second user; determining by the apparatus whether the user entry includes digital rights metadata enabling the apparatus to determine whether the second user is licensed to share at least a portion of the media content asset; and selectively providing the first user with access to at least the portion of the media content asset based on the apparatus determining from the digital rights metadata that the media content asset is licensed to the second user, and determining that the first user is authorized by the second user to access the media content asset.

In another embodiment, an apparatus comprises a network interface circuit and a processor circuit. The network interface circuit is configured for receiving, from a user device via a wide area network, a request for access to a media content asset from a first user of a web-based service provided by the apparatus. The request specifies a second user identified as a user of the web-based service and that has provided access to the media content asset. The processor circuit is configured for retrieving, from a user database, a user entry describing attributes associated with the second user. The processor circuit further is configured for determining whether the user entry includes digital rights metadata enabling the processor circuit to determine whether the second user is licensed to share at least a portion of the media content asset. The processor circuit further is configured for selectively providing the first user with access to at least the portion of the media content asset, based on the processor circuit determining from the digital rights metadata that the media content asset is licensed to the second user, and determining that the first user is authorized by the second user to access the media content asset.

DETAILED DESCRIPTION

Particular embodiments enable users of a web-based service to share media content assets, based on the web-based service managing the digital rights metadata associated with the media content assets. The apparatus executing the web-based service (e.g., a web server device) can be configured for storing, for each user of the web-based service, a corresponding user entry that describes attributes associated with the user interacting with the web-based service. The user entry can include digital rights metadata that identifies whether the user is licensed to access a media content asset, as well as whether the user is licensed to share the media content asset with another user: the digital rights metadata also can identify the extent to which the user is licensed to share the media content asset (e.g., whether any restrictions are imposed by a licensing authority as to the extent that the media content asset may be accessed by the user or shared by the user). The user entry for a first user also can specify whether a second user is authorized to access a media content asset licensed to the first user; hence, the apparatus enables different users of the web-based service (e.g., a social networking website) to share media content assets based on the digital rights metadata stored within the user entries.

The apparatus also can selectively provide access to a media content asset based on detecting that a requesting user has possession of a data structure (e.g., a license token) authorizing access to the media content asset, or possession of a reference (e.g., a license URL) to a licensing authority (e.g., a content provider) that enables the apparatus to verify that the requesting user is authorized to share or access the media content asset. The data structure or reference authorizing sharing or accessing of the media content asset can be obtained by the apparatus either from the user requesting access, the user offering access to the requesting user, or from a content provider that either validates an existing license or notifies the apparatus of a new license that has been purchased.

Hence, the apparatus executing the web-based service enables users to manage all of their media content assets (e.g., digital audio, digital video, digital images, etc.) via their web-based service, eliminating the necessity of a user possessing a mass storage device for local storage of media content assets at the user premises. Moreover, the apparatus executing the web-based service enables users to share their media content assets with other users, in a manner that is controllable by the licensed users and the content provider having licensing authority over the media content, ensuring integrity of copyright protection.

FIG. 1 is a diagram illustrating an example network 10 having an apparatus (e.g., a web server device) 12 configured for executing a web-based service enabling sharing of media content assets between users of the web-based service, according to an example embodiment. The web server device (i.e., web server machine or web server apparatus) 12 includes a processor circuit 26, a network interface circuit 28, and a memory circuit 30. The processor circuit 26 can be configured for executing all aspects of the web-based service (e.g., a social networking website), or can be configured for executing the sharing of the media content assets as part of the web-based service in a multi-server system, where multiple server devices provide distributed processing for different aspects of the web-based service.

The network interface circuit 28 of the web server device 12 is configured for receiving a request 14 from a first user 16a of a user device 18a, where the request 14 is received by the network interface circuit 28 from the user device 18a via an Internet Protocol (IP) based wide area network 20, for example the Internet. Assuming the request 14 from the user 16a is for access to a media content asset 22 (e.g., 22c of FIG. 2) that is offered for sharing by another user 16b, the processor circuit 26 of the web server device 12 can determine whether the user 16b is licensed to share at least a portion of the requested media content asset (e.g., 22c), and whether the user 16a is authorized by the user 16b to access the requested media content asset.

Figure 2:
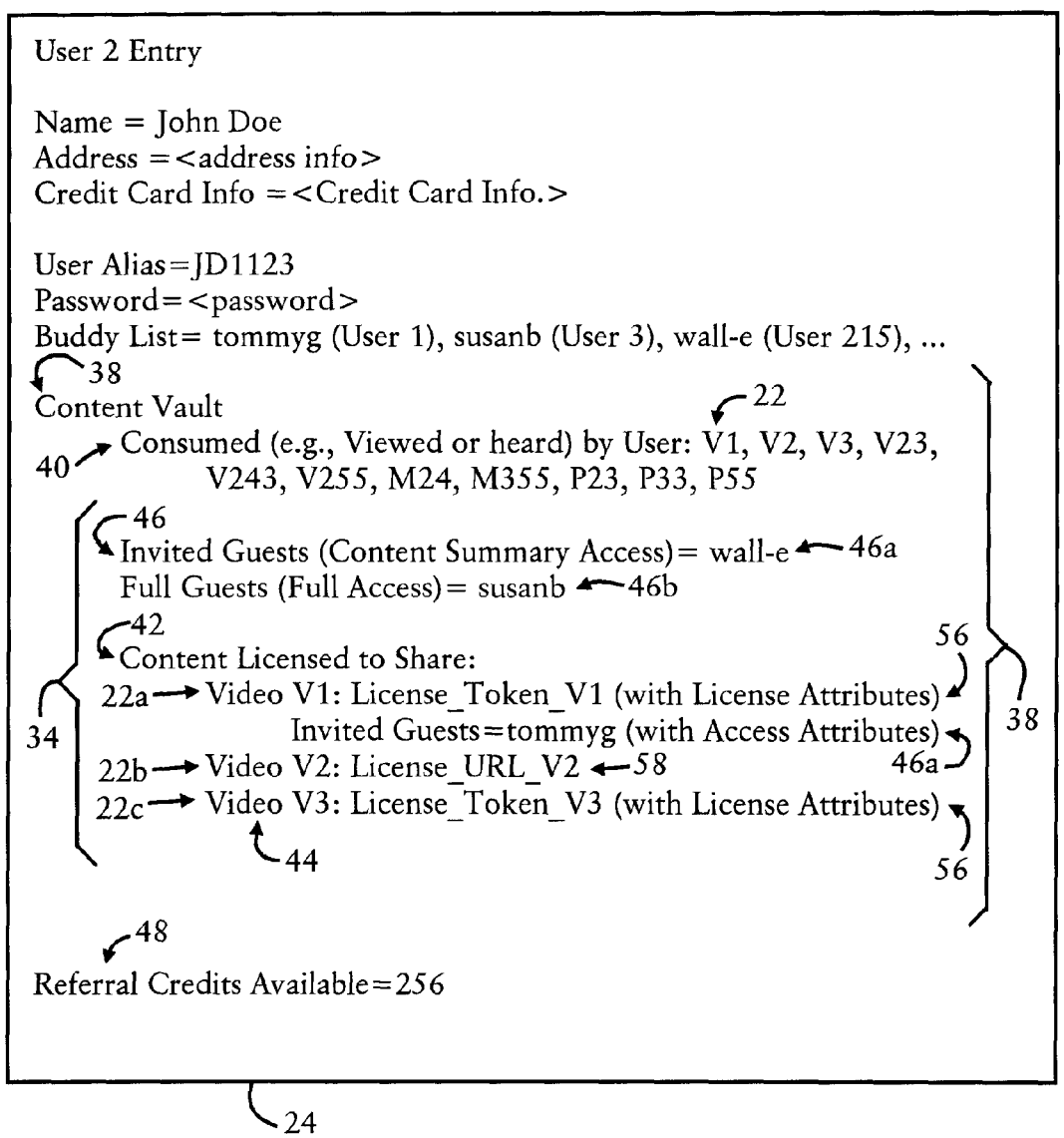
FIG. 2 illustrates an example user entry from the user database of FIG. 1.

In particular, each user 16 of the web-based service executed by the web server device 12 has a corresponding user entry 24 stored by the processor circuit 26 of the web server device 12 as a data structure in a user database 32 upon registration by the user (e.g., 16b) with the web-based service. FIG. 2 illustrates an example user entry 24 for the user 16b ("User 2"), according to an example embodiment. The user entry 24 describes attributes associated with the user 16b, for example user name, user address, billing credit card information, user alias, user password, a buddy list identifying preferred users, etc.

The user entry 24 for the given user 16b also includes a "content vault" 38 that includes identifiers 40 that identify media content assets 22 that have been consumed (e.g., viewed or heard) by the user 16b. The content vault 38 also includes digital rights metadata 34 that enables the processor circuit 26 to determine whether the user 16b is authorized to access identified media content assets 22, and/or whether the user 16b is authorized to share an identified media content asset 22 with another user. The processor circuit 26 can add to the corresponding user entry 24 digital rights metadata 34, received either from the corresponding user (e.g., 16b) or a content provider 36 having licensing authority over the corresponding media content asset. The digital rights metadata 34 stored in the user entry 24 enables the processor circuit 26 to determine whether the corresponding user is licensed to access the identified media content asset, and/or whether the corresponding user is authorized to share the media content asset with another user; the digital rights metadata 34 also can identify the other users that have been granted access to the media content asset. The digital rights metadata 34 can include a list 42 of identifiers 44 for media content assets 22 for which the user 16b is licensed to access and licensed to share with other users. The digital rights metadata 34 also can include identifiers 46 of other users that are authorized to access at least identified portions of the media content assets, for example either authorized for restricted access 46a or unrestricted access 46b.

The user entry 24 for the given user 16b also can include metadata identifying referral credits 48 that are available for purchasing additional licenses for consuming or sharing media content assets. The referral credits 48 can be incremented by the processor circuit 26, for example based on the content provider server 36 issuing a referral credit for content purchased by another user (described below with respect to FIG. 3C), or based on the user 16b completing a prescribed task within the web-based service, for example winning a contest, submitting a number of comments rated favorably by other users, etc.

Any of the disclosed circuits of the web server device 12 (including the processor circuit 26, the network interface circuit 28, the memory circuit 30, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown), where execution of executable code stored in an internal memory circuit (e.g., within the memory circuit 30) causes the processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor circuit. The memory circuit 30 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 30 can be implemented dynamically by the processor circuit 26, for example based on memory address assignment and partitioning executed by the processor circuit 26.

Figure 3A:
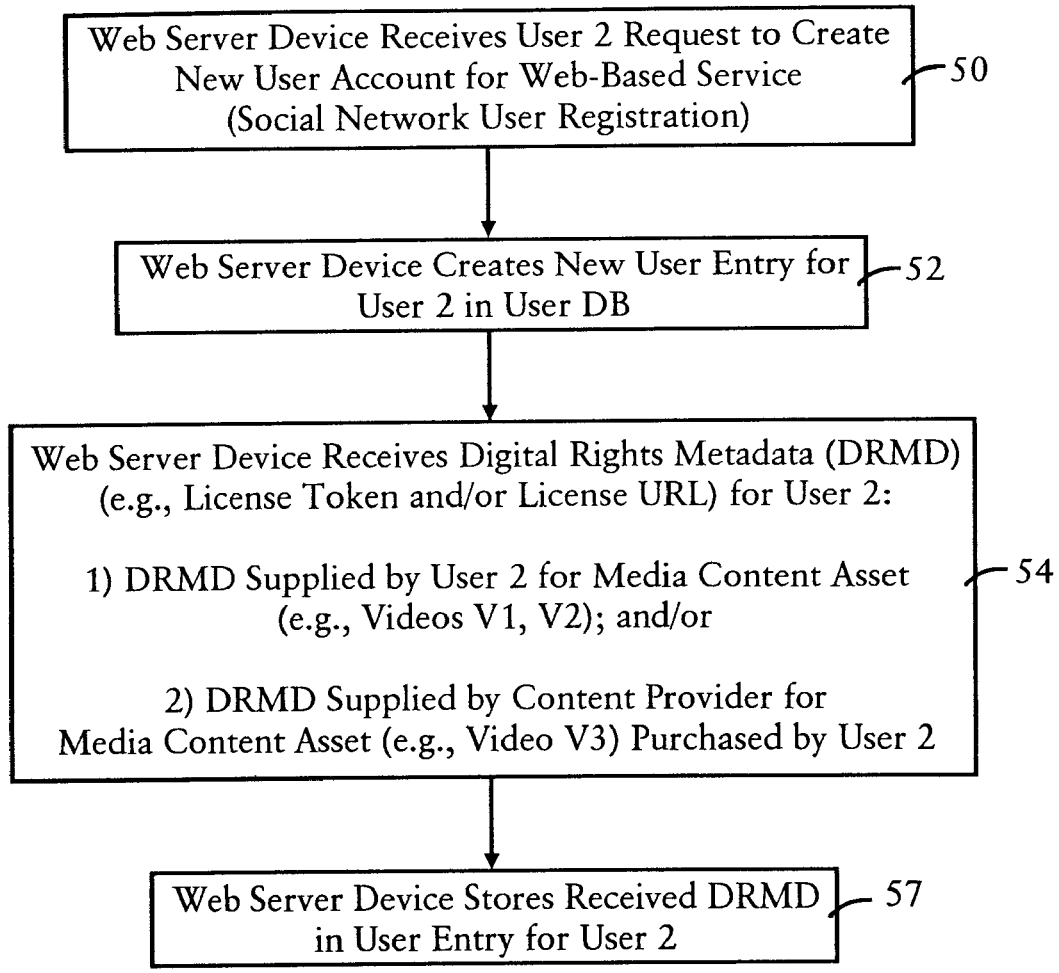
FIGS. 3A, 3B, and 3C summarize an example method by the web server device of FIG. 1 of selectively providing a first user with access to a media content asset licensed to the second user, according to an example embodiment.
Figure 3B:
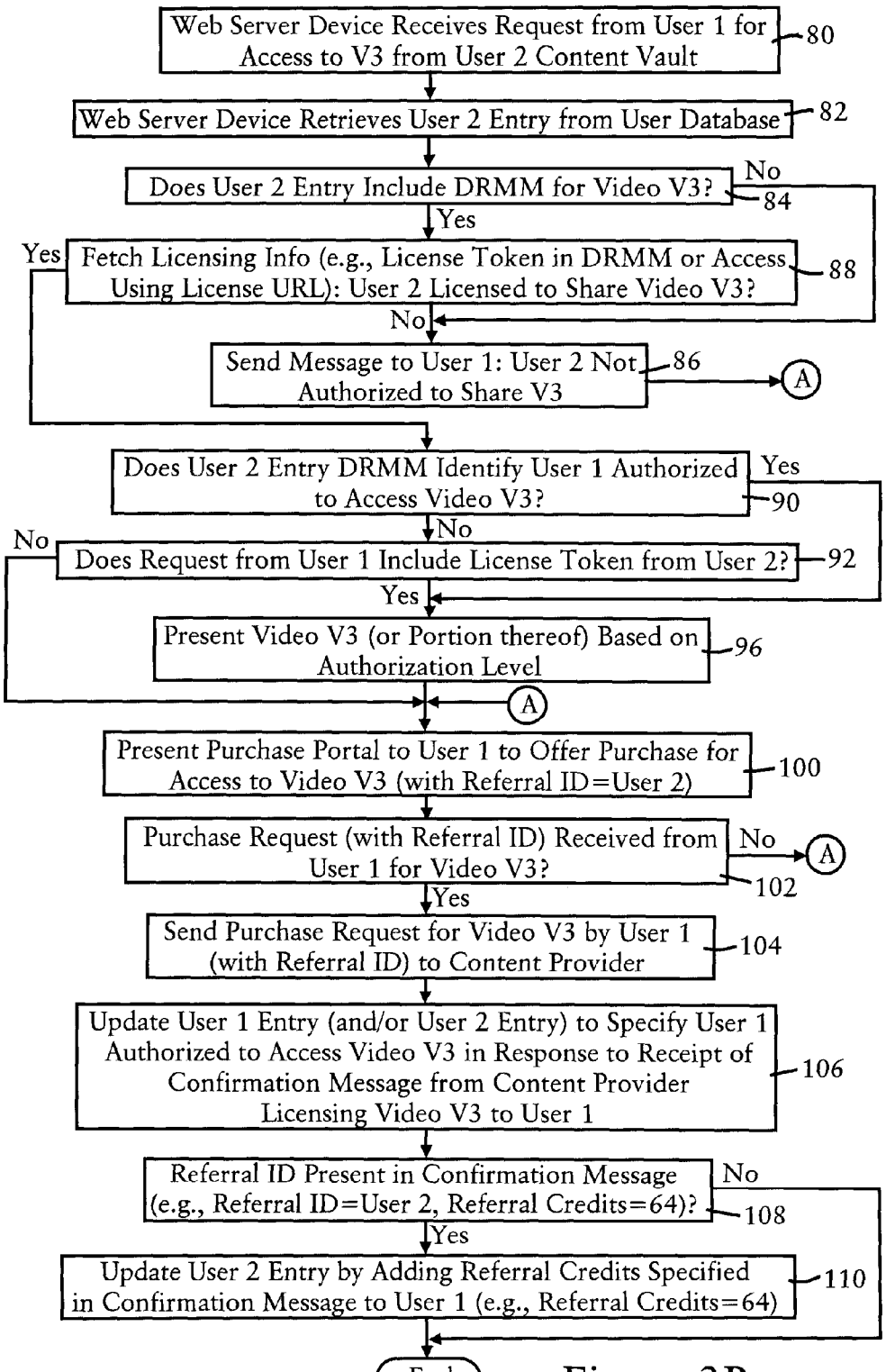
Figure 3C:
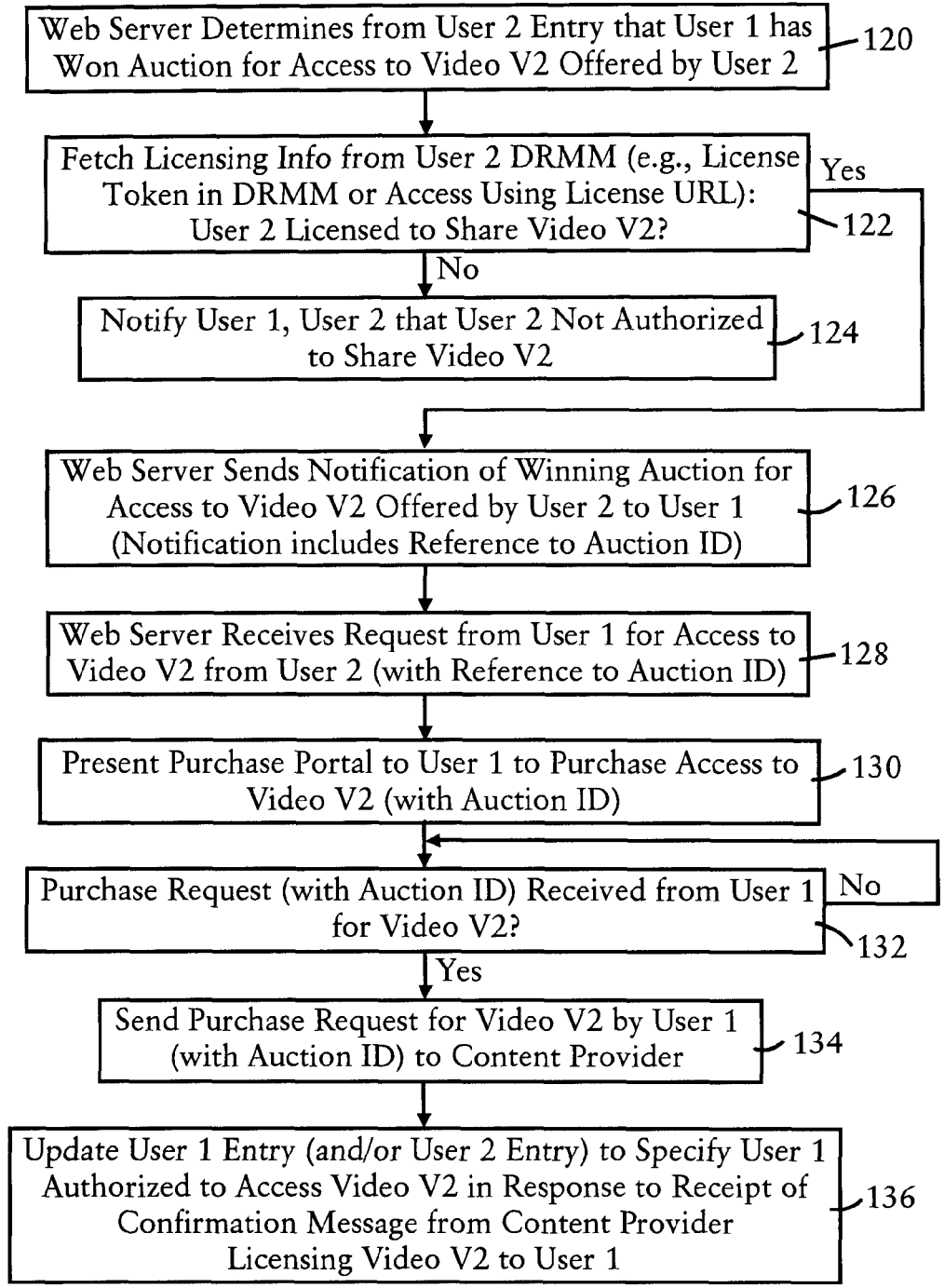

FIGS. 3A, 3B, and 3C summarize an example method by the web server device of FIG. 1 of selectively providing a first user with access to a media content asset licensed to the second user, according to an example embodiment. The steps described in FIGS. 3A, 3B, and 3C can be implemented as executable code stored on a computer readable storage medium (e.g., floppy disk, hard disk, ROM, EEPROM, non-volatile RAM, CD-ROM, etc.) that are completed based on execution of the code by a processor circuit; the steps described herein also can be implemented as executable logic that is encoded in one or more tangible media for execution (e.g., programmable logic arrays or devices, field programmable gate arrays, programmable array logic, application specific integrated circuits, etc.).

FIG. 3A illustrates creation of a new user account by the processor circuit 26 based on creating a user entry 24. The network interface circuit 28 of the web server device 12 receives in step 50 a request from the user ("User 2") 16b, received for example via the corresponding user device 18b in the wide area network 20, for creation of a new user account for the web based service executed by the web server device 12. In response to the network interface circuit 28 receiving the request in step 50, the processor circuit 26 creates in step 52 a new user entry 24 for the user 16b in the user database 32. As illustrated in FIG. 1, the user database 32 is reachable locally by the web server device 12, for example via a new direct link between the network interface circuit 28 and the user database 32 or local area network providing link layer connectivity between the web server device 12 and the user database 32. Alternately, the user database 32 can be reachable by the network interface circuit 28 via the wide area network 20. Hence, the processor circuit 26 creates in step 52 the user entry 24 illustrated in FIG. 2, which a first contains user subscription information such as name, address, credit card information, user alias, password, and/or buddy list.

Following registration by the user 16b resulting in creation of the corresponding user entry 24 by the processor circuit 26, the network interface circuit 28 can be configured for receiving in step 54 at least a portion of the digital rights metadata (DRMD) 34 from the user 16b via the user device 18b in the wide area network 20. The digital rights metadata 34 can be received based on the processor circuit 26 providing to the user device 18b a web-based interface that enables the user 16b to manually supply to the web server device 12 the digital rights metadata using a hypertext transport protocol (HTTP) post. Alternately, the digital rights metadata 34 can be received from the user device 18b as an extensible markup language (XML) tagged document that describes the digital rights metadata 34.

The network interface circuit 28 also can be configured for receiving a message specifying at least a portion of the digital rights metadata 34 from the content provider 36, identifying the media content assets that have been purchased by the user 16b. The content provider 36 can supply the message specifying the relevant portion of the digital rights metadata 34 in response to a request initiated by the user 16b (e.g., transfer licensing information to the web service executed by web server device 12), or in response to a query initiated by the processor circuit 26 in response to the registration by the user in step 50 and 52. The processor circuit 26 is configured for storing in step 57 the digital rights metadata 34, received from either the user device 18b or the content provider server 36, into the user entry 24.

As illustrated in FIG. 2, the digital rights metadata 34 can include a data structure (e.g., a license token) 56, and/or a reference (e.g., a license URL) 58 that enables the processor circuit 26 to determine whether the user 16b is licensed to access the corresponding media content asset 22, and/or whether the user 16b is licensed to share the media content asset with another user (e.g., 16a).

Figure 4:
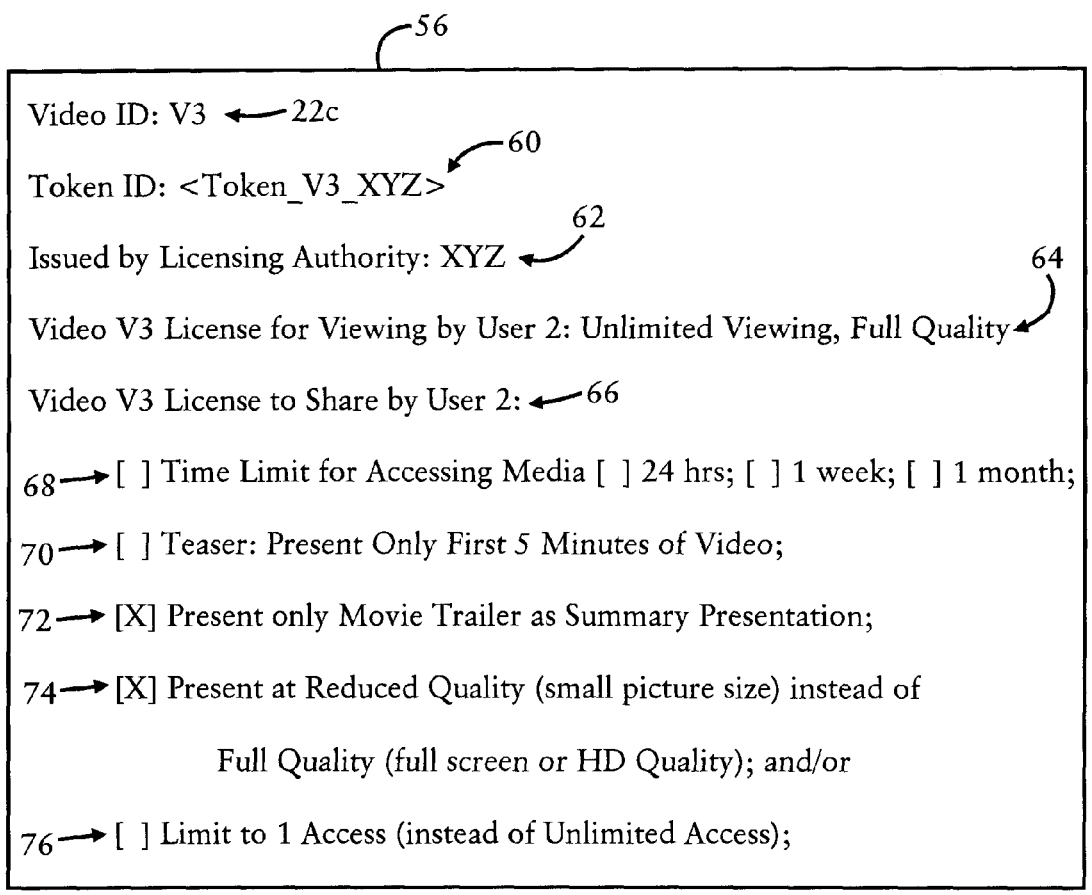
FIG. 4 illustrates an example data structure (e.g., a license token) specifying licensing attributes describing authorization enabling a user to share a media content asset with another user, according to an example embodiment.

FIG. 4 illustrates an example license token 56 stored in the user entry 24 for the media content asset 22c. The license token 56 can be issued by the content provider 36 that has licensing authority over the corresponding media content asset (e.g., 22a or 22c). Various licensing arrangements can be offered by the licensing authority. Example sharing of the media content asset 22c can involve the licensing authority ("XYZ") granting to the user (User 2) 16b authority to grant a sublicense to one or more other users ("guests" or "buddies"). Hence, the license token 56 also can be issued by another user that has authority to share the media content asset 22c with one or more individuals. The example sharing also can include granting the user (User 2) 16b authority to offer a multiple-generation sublicense (e.g., from User 2 to User 3; User 3 grants to User 4). Hence, the license token 56 can serve as a "guest pass", a "limited duration pass", etc., enabling the user 16b to grant a "guest pass" to one or more other users for access to a media content asset as desired by the user 16b and according to the authorization granted by the licensing authority. As described with respect to FIG. 2, a user also can be granted access to a media content asset owned by the user 16b based on having their corresponding user identifier 46 specified within the digital rights metadata 34. Hence, the "guest pass" to a user (e.g., "User 1") can be implemented by adding the corresponding user identifier 46 to the digital rights metadata 34 for a specific media content asset (see, e.g., invited guest "tommyg" for asset V1 22a), generic restricted (content summary) access 46a or generic unrestricted access 46b, and/or by sending the "guest pass" in the form of a license token 45 to the user (e.g., "User 1").

The license token 56 includes an identifier identifying the licensed media content asset 22c, a secure and unique token identifier 60, a licensing authority identifier 62 identifying the licensing authority 36, user license access attributes 64, and user sharing license attributes 66. As illustrated in FIG. 4, the user license access attributes 64 specify the scope of the license granted to the user 16b for the identified media content asset 22c, based on the purchase option purchased by the user 16b from the authorized licensor 36 (e.g., limited access limited quality, unlimited access, full quality, etc.). The user sharing license attributes 66 specify the scope of the license granted to the user 16b regarding sharing the identified media content asset 22c. As illustrated in FIG. 4, the user sharing license attributes 66 can specify various limits or restrictions on sharing the media content asset 22c imposed by the licensing authority 36, including a restriction 68 that limits access by one or more users for a limited time interval, a restriction 70 for accessing only a selected portions of the media content asset 22c, a restriction 72 for accessing only a summary presentation (e.g., and a movie trailer) of the media content asset 22c, a restriction 74 for accessing the shared media content asset 22c at a reduced quality (e.g., a small picture size) instead of a full quality (e.g., full-screen or high definition (HD) quality), and/or a restriction 76 limiting the number of times that the media content asset 22c can be shared with one or more users.

Hence, the license token 56 stored in the user entry 24 as part of the digital rights metadata 34 enables the processor circuit 26 to precisely identify the scope of the license granted to the second user with respect to sharing the corresponding media content asset 22.

The digital rights metadata 34 also can include a reference 58 to the content provider 36, for example a URL, that enables the processor circuit 26 to query the content provider server 36 whether the user 16b is authorized to share the identified media content asset 22b.

FIG. 3B illustrates the web server device 12 selectively providing the first user 16a with access to at least a portion of a media content asset 22c that is licensed to the second user 16b, according to an example embodiment. The network interface circuit 28 of the web server device 12 receives in step 80 the request 14 from the user 16a via the wide area network 20. The request 14 specifies that the first user 16a requests access to the media content asset ("V3") 22c from the content vault 38 of the second user 16b. Hence, the processor circuit 26 determines that the request specifies the second user 16b as a user of the web-based service and that has provided access to the media content asset 22c identified in the request 14.

The processor circuit 26 retrieves in step 82 the corresponding user entry 24 for the user 16b from the user database 32. As described above with respect to FIG. 2, the user entry 24 describes the attributes associated with the second user 16b, including digital rights metadata 34 that enables the processor circuit 26 to determine whether the second user 16b is licensed to share at least a portion of the requested media content asset 22c. The processor circuit 26 determines in step 84 whether the corresponding user entry 24 for the user 16b includes any digital rights metadata 34 that enables the processor circuit 26 to determine whether the user 16b is licensed to share any portion of the requested media content asset 22c. Assuming in step 84 that the digital rights metadata 34 for the user 16b did not include the license token 56 for the requested video stream 22c, the processor circuit is configured for sending in step 86 a message to the first user 16a (and optionally the second user 16b) specifying that the second user 16b is not authorized to share the requested video content asset "V3" 22c.

If in step 80 for the processor circuit 26 determines that the user entry 24 for the second user 16b includes digital rights metadata 34 for the requested media content asset 22c, the processor circuit 26 fetches in step 88 the licensing information 56 or 58, as appropriate. Assuming the licensing information is implemented as a data structure (e.g., a license token) 56, the processor circuit 26 can parse the data structure 56, illustrated in FIG. 4, to determine in step 88 whether the second user 16b is licensed to share the requested media content asset "V3" 22c. Assuming the licensing information is implemented as a license URL 58, the processor circuit 26 can send a query to the content provider server 36 having the licensing authority over the requested media content asset 22c to determine whether the second user 16b is authorized to share the identified media content asset 22c.

Assuming the processor circuit 26 determines in step 88 that the user 16b is authorized to share the requested media content asset 22c, the processor circuit 26 determines in step 90 whether digital rights metadata 34 specifies that the user 16b has authorized the requesting user 16a to access the requested media content asset 22c. If the processor circuit 26 determines in step 90 that the digital rights metadata 34 specifies an identifier 46 that identifies the user 16a is authorized to access the requested media content asset 22c (e.g., as illustrated by the media content asset 22a authorizing access by the user 16a), the processor circuit 26 can present the requested media content asset in step 96.

If the processor circuit 26 determines in step 90 that the digital rights metadata 34 does not identify the first user 16a as authorized to access the requested media content asset 22c, the processor circuit 26 determines in step 92 whether the request 14 from the user 16a includes a license token 56 from the user 16b. Hence, the user 16b can send a license token 56 to the user 16a, for example in the form of an invitation (e.g., a "guest pass" valid only for a prescribed time interval) to view the media content asset, eliminating the necessity that the user 16a is specified in the digital rights metadata 34. Also note that the user 16b can create his or her own licensing tokens for a media content asset that is created by the user 16b and for which the user 16b owns full authority for distributing the media content asset.

If the processor circuit 26 determines in step 92 that the request 14 from the requesting user 16a does not include a license token issued by the user 16b, the processor circuit 26 can determine that the user 16a is not authorized to access the requested media content asset 22c. In response to determining the user 16a is not authorized to access the media content asset 22c from the user 16b, the processor circuit 26 can present in step 100 a purchase portal to the user 16a for purchasing access to the media content asset 22c. Also note that the purchase portal can be presented by the processor circuit 26 if the user 16b is not authorized to share the requested media content asset 22c. The purchase portal presented in step 100 by the processor circuit 26 also can present a referral identifier that identifies the second user 16b as recommending the purchase of the requested media content asset 22c. Hence, if in step 102 the network interface circuit 28 receives a purchase request to purchase access to the media content asset 22c with the referral identifier from the user 16a, the processor circuit 26 can send in step 104 a purchase request for the media content asset 22c by the user 16a, as well as the referral identifier that identifies the second user 16b, to the content provider server 36.

In response to the network interface circuit 28 receiving in step 106 a confirmation message from the content provider 36 specifying that the first user 16a is licensed to access the media content asset 22c, the processor circuit 26 updates in step 106 the corresponding user entry 24 of the user 16a (and/or optionally the user entry 24 of the referring user 16b) to specify that the first user 16a is authorized to access the media content asset 22c. Hence, the media content asset 22c of the user 16b can be shared with the user 16a, while preserving the integrity of licensing and copyright requirements imposed by the content provider 36. If in step 108 the confirmation message for the user 16a includes a referral identifier specifying a prescribed number of referral credits for the referring user 16b, the processor circuit 26 can update in step 110 the user entry 24 of the referring user 16b by adding the referral credits specified in the confirmation message to the existing available referral credits 48 stored in the user entry 24.

According to the example embodiments, users of a web-based service can share media content assets based on digital rights metadata, stored for at least one of the users, that identify authorization and licensing rights that are granted for sharing the media content assets.

The disclosed web server device 12 also can selectively provide media content assets between users based on the users 16a and 16b participating in an auction hosted by the web-based service executed by the web server device 12. As illustrated in FIG. 3C, assume that the user 16b is hosting an auction for access to the media content asset "V2" 22b: the user entry 24 will include the appropriate metadata (not shown) describing the parameters of the option, for example auction identifier, auction start and ending time, minimum bid, item description, highest bidder identifier and highest bid amount, etc.

In response to the processor circuit 26 of the web server device 12 determining in step 120 that the user 16a has won the auction for the access to the media content asset 22b offered by the user 16b, the processor circuit 26 can retrieve in step 122 the digital rights metadata 34 to verify that the user 16b is licensed to share the auctioned media content asset 22b. If the processor circuit 26 determines that the user 16b is not licensed to share the auctioned media content asset 22b, the processor circuit 26 notifies both the winning user 16a and the auction host 16b in step 124, providing the users 16a and 16b an opportunity to resolve the licensing and auction issues. Assuming the processor circuit 26 determines in step 122 that the user 16b is licensed to share the auctioned media content asset 22b, the processor circuit 26 sends in step 126 a notification to the user 16a that he or she has won the auction for the media content asset "V2" 22b hosted by the user 16b: the notification includes a reference to an auction identifier, enabling subsequent requests from the user 16a to be associated by the processor circuit 26 to the auction hosted by the user 16b.

In response to the network interface circuit 20 receiving in step 128 the request 14 for access to the media content asset 22b and specifying the reference to the auction identifier, the processor circuit 26 can present in step 130 a purchase portal to the user 16a, enabling the user 16a to purchase the access to the media content asset 22b. In response to the network interface circuit 28 receiving in step 132 the purchase request from the user 16a with the auction identifier for the auctioned media content asset 22b, the processor circuit 26 sends in step 134 a purchase request for the option media content asset 22b, along with the auction identifier, to the content provider 36 for completion of the licensing transaction. The processor circuit 26 updates in step 136 the user entry 24 for the user 16a (and/or the user 16b) to specify that the user 16a is authorized to access the media content asset 22b in response to the network interface circuit 20 receiving a confirmation message from the content provider 36 licensing the media content asset 22b to the user 16a. The foregoing auction also can be utilized to enable the user 16b ("seller") to sell his or her digital rights for a media content asset to a user 16a ("buyer"), such that the seller no longer has any rights to consume or share the media content asset after completion of the sale.

According to example embodiments, users of a web-based service executed by an apparatus can share media content assets while maintaining the integrity of copyright restrictions required by authorized licensing authorities. Further, any web-enabled device 18 can be used by a user for sharing media content assets.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    receiving a request for access to a media content asset from a first user of a web-based service, the request received via a wide area network by an apparatus providing the web-based service, the request specifying a second user identified as a user of the web-based service and that has provided access to the media content asset;
    retrieving, by the apparatus from a user database, a user entry describing attributes associated with the second user;
    determining by the apparatus whether the user entry includes digital rights metadata enabling the apparatus to determine whether the second user is licensed to share at least a portion of the media content asset with another user of the web-based service; and
    selectively providing the first user with access to at least the portion of the media content asset based on the apparatus determining from the digital rights metadata that the media content asset is licensed to the second user and that the second user is licensed to share at least the portion of the media content asset with another user of the web-based service, and determining that the first user is authorized by the second user to access the media content asset.

2. The method of claim 1, further comprising:
    receiving by the apparatus from the second user the digital rights metadata identifying that the second user is authorized to share at least the media content asset requested by the first user; and
    storing by the apparatus the digital rights metadata received from the second user into the corresponding user entry.

3. The method of claim 2, wherein the digital rights metadata includes at least one of a data structure issued by a content provider having licensing authority over the media content asset and indicating that the second user is authorized to share the media content asset, or a reference to the content provider enabling the apparatus to query whether the second user is authorized to share the media content asset.

4. The method of claim 1, further comprising:
    receiving by the apparatus, from a content provider having licensing authority over the media content asset, a message specifying the digital rights metadata indicating that the second user is licensed to share at least the portion of the media content asset; and
    storing by the apparatus the digital rights metadata received from the content provider into the user entry.

5. The method of claim 1, further comprising the apparatus presenting to the first user a purchase portal for purchasing access to the media content asset based on determining from the digital rights metadata at least one of the second user is not licensed to share the at least the portion of the media content asset, or that the first user is not authorized to access the media content asset licensed to the second user.

6. The method of claim 5, further comprising:
    the apparatus detecting the first user has won an auction offered by the second user for access to the media content asset; and the apparatus sending a notification, in response to the first user having won the auction, for the first user to initiate the request, the request including a reference to the auction that enables the apparatus to present the purchase portal for payment of the auction by the first user.

7. The method of claim 1, further comprising:
the apparatus receiving from the first user a purchase request for the media content asset, the apparatus in response sending the purchase request to a content provider having licensing authority over the media content asset; and
updating in the user database the corresponding user entry associated with the first user to specify the first user is authorized to access the media content asset, in response to a confirmation message from the content provider specifying that the first user is licensed to access the media content asset.

8. The method of claim 7, wherein the purchase request includes a referral identifier that identifies the second user as recommending purchase of the media content asset by the first user, the method further comprising:
receiving from the content provider a referral credit for the second user based on the referral identifier; and
updating the corresponding user entry associated with the second user to include the referral credit, the referral credit available for use by the second user for purchasing access to other media content assets.

9. The method of claim 1, wherein the selectively providing includes at least one of:
determining the digital rights metadata identifies the first user as authorized by the second user to access the media content asset; or
determining from the request a data structure identifying the second user has authorized the first user to access the media content asset.

10. The method of claim 1, wherein the attributes stored in the user entry associated with the second user further includes first identifiers of first media content assets that have been consumed by the second user, second identifiers of second media content assets for which the second user is licensed to share at least a portion of the respective media content assets, and third identifiers of other users of the web-based service that are authorized to access at least identified portions of the second media content assets.

11. The method of claim 1, wherein the license to share at least a portion of the media content asset limits access to the media content asset based on at least one of accessing the media content asset for a limited time interval, accessing only a selected portion of the media content asset, accessing only a summary presentation of the media content asset, or accessing the media content asset according to a limited presentation quality less than an available presentation quality.

12. An apparatus comprising:
a network interface circuit configured for receiving, from a user device via a wide area network, a request for access to a media content asset from a first user of a web-based service provided by the apparatus, the request specifying a second user identified as a user of the web-based service and that has provided access to the media content asset; and
a processor circuit configured for retrieving, from a user database, a user entry describing attributes associated with the second user, the processor circuit further configured for determining whether the user entry includes digital rights metadata enabling the processor circuit to determine whether the second user is licensed to share at least a portion of the media content asset with another user of the web-based service, the processor circuit further configured for selectively providing the first user with access to at least the portion of the media content asset, based on the processor circuit determining from the digital rights metadata that the media content asset is licensed to the second user and that the second user is licensed to share at least the portion of the media content asset with another user of the web-based service, and further based on the processor circuit determining that the first user is authorized by the second user to access the media content asset.

13. The apparatus of claim 12, wherein:
the network interface circuit is configured for receiving from the second user the digital rights metadata identifying that the second user is authorized to share at least the media content asset requested by the first user;
the processor circuit configured for storing the digital rights metadata received from the second user into the corresponding user entry.

14. The apparatus of claim 13, wherein the digital rights metadata includes at least one of a data structure issued by a content provider having licensing authority over the media content asset and indicating that the second user is authorized to share the media content asset, or a reference to the content provider enabling the processor circuit to query whether the second user is authorized to share the media content asset.

15. The apparatus of claim 12, wherein:
the network interface circuit is configured for receiving, from a content provider having licensing authority over the media content asset, a message specifying the digital rights metadata indicating that the second user is licensed to share at least the portion of the media content asset;
the processor circuit configured for storing the digital rights metadata received from the content provider into the user entry.

16. The apparatus of claim 12, wherein the processor circuit is configured for presenting to the first user a purchase portal for purchasing access to the media content asset based on the processor circuit determining from the digital rights metadata at least one of the second user is not licensed to share the at least the portion of the media content asset, or that the first user is not authorized to access the media content asset licensed to the second user.

17. The apparatus of claim 16, wherein:
the processor circuit is configured for detecting the first user has won an auction offered by the second user for access to the media content asset; and
the processor circuit is configured for sending a notification, in response to the first user having won the auction, for the first user to initiate the request, the request including a reference to the auction that enables the processor circuit to present the purchase portal for payment of the auction by the first user.

18. The apparatus of claim 12, wherein:
the network interface circuit is configured for receiving from the first user a purchase request for the media content asset, the processor circuit configured for sending the purchase request to a content provider having licensing authority over the media content asset;
the processor circuit further configured for updating in the user database the corresponding user entry associated with the first user to specify the first user is authorized to access the media content asset, in response to the network interface circuit receiving a confirmation message from the content provider specifying that the first user is licensed to access the media content asset.

19. The apparatus of claim 18, wherein:

the purchase request includes a referral identifier that identifies the second user as recommending purchase of the media content asset by the first user;

the network interface circuit configured for receiving from the content provider a referral credit for the second user based on the referral identifier;

the processor circuit configured for updating the corresponding user entry associated with the second user to include the referral credit, the referral credit available for use by the second user for purchasing access to other media content assets.

20. The apparatus of claim 12, wherein:

the processor circuit is configured for determining whether the digital rights metadata identifies the first user as authorized by the second user to access the media content asset; or the processor circuit is configured for determining from the request a data structure identifying the second user has authorized the first user to access the media content asset.

21. The apparatus of claim 12, wherein the attributes stored in the user entry associated with the second user further includes first identifiers of first media content assets that have been consumed by the second user, second identifiers of second media content assets for which the second user is licensed to share at least a portion of the respective media content assets, and third identifiers of other users of the web-based service that are authorized to access at least identified portions of the second media content assets.

22. The apparatus of claim 12, wherein the license to share at least a portion of the media content asset limits access to the media content asset based on at least one of accessing the media content asset for a limited time interval, accessing only a selected portion of the media content asset, accessing only a summary presentation of the media content asset, or accessing the media content asset according to a limited presentation quality less than an available presentation quality.

23. Logic encoded in one or more tangible media for execution and when executed by an apparatus operable for:

receiving a request for access to a media content asset from a first user of a web-based service, the request received via a wide area network by the apparatus executing the logic and providing the web-based service, the request specifying a second user identified as a user of the web-based service and that has provided access to the media content asset;

retrieving, by the apparatus from a user database, a user entry describing attributes associated with the second user;

determining by the apparatus whether the user entry includes digital rights metadata enabling the apparatus to determine whether the second user is licensed to share at least a portion of the media content asset with another user of the web-based service; and selectively providing the first user with access to at least the portion of the media content asset based on the apparatus determining from the digital rights metadata that the media content asset is licensed to the second user and that the second user is licensed to share at least the portion of the media content asset with another user of the web-based service, and the apparatus determining that the first user is authorized by the second user to access the media content asset.

24. An apparatus comprising:

a network interface circuit configured for receiving, from a user device via a wide area network, a request for access to a media content asset from a first user of a web-based service provided by the apparatus, the request specifying a second user identified as a user of the web-based service and that has provided access to the media content asset;

means for retrieving, from a user database, a user entry describing attributes associated with the second user, the means for retrieving further configured for determining whether the user entry includes digital rights metadata enabling the means for retrieving to determine whether the second user is licensed to share at least a portion of the media content asset with another user of the web-based service, the means for retrieving further configured for selectively providing the first user with access to at least the portion of the media content asset, based on the means for retrieving determining from the digital rights metadata that the media content asset is licensed to the second user and that the second user is licensed to share at least the portion of the media content asset with another user of the web-based service, and further based on the means for retrieving determining that the first user is authorized by the second user to access the media content asset.

* * * * *